United States Patent [19]

Kulkarni

[11] Patent Number: 5,950,193
[45] Date of Patent: Sep. 7, 1999

[54] INTERACTIVE RECORDS AND GROUPS OF RECORDS IN AN ADDRESS BOOK DATABASE

[75] Inventor: Purushottam Madhukar Kulkarni, Redmond, Wash.

[73] Assignee: Microsoft Corporation, Redmond, Wash.

[21] Appl. No.: 08/991,078

[22] Filed: Dec. 16, 1997

[51] Int. Cl.$^6$ ..................................................... G06F 17/30
[52] U.S. Cl. ........................ 707/3; 707/2; 707/5; 707/6; 707/507
[58] Field of Search ................................ 707/5, 507, 532, 707/1, 2, 3, 6, 102

[56] References Cited

U.S. PATENT DOCUMENTS

| | | | |
|---|---|---|---|
| 4,805,099 | 2/1989 | Huber | 707/102 |
| 5,455,945 | 10/1995 | VanderDrift | 707/2 |
| 5,508,912 | 4/1996 | Schneiderman | 707/6 |
| 5,561,793 | 10/1996 | Bennett et al. | 707/201 |
| 5,787,416 | 7/1998 | Tabb et al. | 707/2 |
| 5,809,497 | 9/1998 | Freund et al. | 707/2 |
| 5,873,108 | 2/1999 | Goyal et al. | 707/507 |
| 5,877,819 | 3/1999 | Branson | 348/701 |

OTHER PUBLICATIONS

Kanai, Watanabe T., "Visual interface for retrieval of electronic–formed books", Proceedings of the Second International Conference on Document Analysis and Recognition, 1993. Oct. 20–22, 1993, pp. 692–695.

*Primary Examiner*—Wayne Amsbury
*Assistant Examiner*—Shahid Alam
*Attorney, Agent, or Firm*—Jones & Askew, LLP

[57] ABSTRACT

An address book database includes household records in addition to contact records and group records. A household record contains a household distribution list that identifies a household group of contact records and a family group of contact records. The household distribution list further contains information about the relative hierarchy of each contact record in the family group, and that hierarchical information can be used to generate family trees. Each household record further contains a name field and other types of fields. Contact records that are included in the household distribution list include a household property which points to the household record so that entries of the household record can be displayed in place of entries of the contact records. Additionally, when a household record is created based upon a previously created contact record, entries of the contact record are copied to the household record, and entries for a name field, letter salutation field and address name field of the household record are created based at least partially upon the entry in the name field of the contact record.

20 Claims, 13 Drawing Sheets

| 58 | 60 | 62 |

Name 64a
John Cook

Birthday 64b
1/28/52

Home Address 64c
2343 Countryside Ct., Bellingham, Washington 98114

Home Phone Number 64d
(206) 234-7868

Work Address 64e
101 Main St., Suite 506, Bellingham, Washington 98223

Work Phone Number 64f
(206) 576-7979

FIG. 2

| 58 | 60 | 62 |

Spouse Name 64g
Betty Cook

Birthday 64h
7/13/53

Child Name 64i
Bruce Cook

Birthday 64j
4/21/75

Child Name 64k
Nancy Cook

Birthday 64l
9/16/78

Cohabitant Name 64m
Bob Baker

Birthday 64n
8/4/64

Household  X  72

FIG. 3

| 58 | 60 | 62 |

Household Name *64o*
Cook

Letter Salutation *64p*
Dear Cook Family

Address Name *64q*
The Cook Family

Home Address *64r*
2343 Countryside Ct., Bellingham, Washington 98114

Home Phone Number *64s*
(206) 234-7868

Pet Name *64t*
Barney

Pet Type *64u*
Dog

| | Name | Home Address | Home Phone Number |
|---|---|---|---|
| ☐ | Baker, Bob | 2343 Countryside Ct.,... | (206) 234-7868 |
| ☐ | Cook ⇧ | 2343 Countryside Ct.,... | (206) 234-7868 |
| ☐ | Cook, Betty | 2343 Countryside Ct.,... | (206) 234-7868 |
| ☐ | Cook, Bruce | 2343 Countryside Ct.,... | (206) 234-7868 |
| ☐ | Cook, John | 2343 Countryside Ct.,... | (206) 234-7868 |
| ☐ | Cook, Nancy | 301 Hadrian Way,... | (704) 368-8424 |
| ☐ | Doe, Sam | | |
| ☐ | Holiday Cards ▤ | | |
| ☐ | Jacobs, Sue | 5700 Orchard Way... | (878) 358-8499 |

FIG. 8

| Name | Home Address | Home Phone Number |
|---|---|---|
| ☐ Baker, Bob | 2343 Countryside Ct.,... | (206) 234-7868 |
| ☐ Cook △ | 2343 Countryside Ct.,... | (206) 234-7868 |
| ☐ Cook, Betty | 2343 Countryside Ct.,... | (206) 234-7868 |
| ☐ Cook, Bruce | 298 Burleigh St.,... | (919) 645-0757 |
| ☐ Cook, John | 2343 Cramerton Ave.,... | (404) 749-9877 |
| ☐ Cook, Nancy | 2343 Countryside Ct.,... | (206) 234-7868 |
| ☐ Doe, Sam | 301 Hadrian Way,... | (704) 368-8424 |
| ☐ Holiday Cards ▭ | | |
| ☐ Jacobs, Sue | 5700 Orchard Way... | (878) 358-8499 |

INTERACTIVE RECORDS AND GROUPS OF RECORDS IN AN ADDRESS BOOK DATABASE

TECHNICAL FIELD

The present invention relates to databases, and more particularly to address book databases that contain records and groups of records.

BACKGROUND OF THE INVENTION

Prior to the advent of computers, a person often kept track of contacts or addresses by means of a set of index cards, each of which included handwritten information about a single contact. Typically each card contained a contact's name as well as pertinent information or entries about that contact, such as his or her birthday, home address, home phone number, work facsimile number, cellular phone number, e-mail address, work address, work phone number, work facsimile number, related family members, pet names and types, whether he or she is to be sent a holiday greeting card, and so on. Obviously using hand-written cards to keep track of contacts can be cumbersome, especially when information about a contact repeatedly changes such that entries on his or her card must be repeatedly changed.

With the advent of computers and address book application programs, it has become common for the information or entries that used to be kept on index cards for contacts to be included in computerized address book databases. Having such contact information in a computerized address book database has numerous advantages related to sorting, editing and printing. For example, many address book application programs operate under an operating system, such as "WINDOWS 95" that is manufactured and sold by Microsoft Corporation of Redmond, Wash., having a graphical user interface (GUI) that conveys information to and receives commands from a user. The GUI makes it very easy for a user to interact with a computerized address book database by providing a variety of functional elements or objects, including icons, text, numerals, drop-down menus, dialog boxes, toolbars, buttons, tabs and the like.

Conventional address book databases typically include contact records and group records. A contact record can be for any individual contact such as person, company or other entity. A contact record typically contains a name field and other types of fields, such as a birthday field, a home address field, a home phone number field, a work address field, a work phone number field and a wide variety of other fields. Each field of a contact record can contain an entry (i.e., data) that corresponds to the field type. That is, a name field typically contains a name entry, a birthday field typically contains a birthday entry, and so on. Entries in databases are typically assigned properties to distinguish different types of entries from one another. For example, name entries may be assigned a first property and birthday entries may be assigned a second property so that those entries can be distinguished and assigned to their corresponding fields.

A conventional group record typically contains a distribution list having properties that define a group, which is a collection of contact records. A conventional group record further contains a name field. Conventional address book application programs provide a screen display that can be used to create a new group or change the membership of an existing group. That screen display includes a compartment that includes a list of the names of the contact records that are members of the group, and a display compartment that includes a list of the names of all of the contact records in the address book database. The display compartments are typically equipped with vertical scroll bars that allow a user to scroll through the lists in the display compartments. A membership selection box is included next to each name in the display compartment that contains a list of all of the contact records in the address book database. Membership selection boxes next to the names of the contact records that are members of the group include a mark to indicate that those names are selected. Membership selection boxes next to the names of the contact records that are not members of the group do not include a mark, which indicates that those names are not selected. The membership of the group can be changed by selecting and unselecting the membership selection boxes.

Conventional address book application programs typically provide data entry screens with blanks or display compartments for receiving entries for a new contact. Such application programs also provide screen displays which can each be characterized as including a plurality of display compartments that are arranged in columns and rows. Each display compartment is a data entry blank (i.e., a space where data for entries of the address book database can be input and edited). Each row of display compartments corresponds to either a contact record or a group record. A heading above each column of display compartments identifies the type of field to which the display compartments in that column correspond. Each display compartment for the name field of a group record includes a symbol of an index card. Each display compartment for the name field of a record includes a selection box that can be selected or unselected for purposes of generating output, such as printouts, mailing labels, initiating telephone calls or other electronic communications, or the like. Only the entries contained in the fields of a contact record are displayed in display compartments that correspond to that contact record. Likewise, when a contact record is output, such as for printing, only the entries contained in the fields of the contact record are output.

While conventional address book application programs have many advantages over other techniques for keeping track of contacts, there is always a need for improved methods for keeping track of those contacts. For example, a problem with prior address book software products is that they tend to be best suited for keeping track of individuals and do not have a mechanism that efficiently keeps track of families. A family can be input as an individual record in prior address book software, but links between that record and the records for the individuals of that family are not automatically established. This makes it difficult to efficiently communicate with families as a whole, as special care must be taken to keep track of family relationships. This also makes it labor intensive to update address books when a family moves, as traditionally the address for each of the individuals of the moving family must be updated. That is, duplicate data must be entered, and that duplicate data unnecessarily consumes storage space.

Therefore, there is a need in the art for improved address book databases, systems and methods that provide mechanisms that efficiently keep track of families and minimize data entry and the number of entries contained in address book databases.

SUMMARY OF THE INVENTION

The present invention satisfies the above-described needs by providing an improved address book database, as well as a system and methods, that minimize data entries and the number of entries contained in address book databases, and further provide mechanisms that efficiently keep track of families.

In accordance with one aspect of the present invention, an address book database is provided that includes household records in addition to contact records and group records. A household record can contain a household distribution list having properties that define a household group, which is a collection of contact records, and a family group, which is a collection of contact records and is a subset of the household group. A household distribution list may contain information that provides an indication of the relative hierarchy of each contact record in the family group defined by that household distribution list. That hierarchical information, in combination with other information in the address book database, may be used to generate family trees. Each household record can further contain a name field and other types of fields, such as a letter salutation field, an address name field, a home address field, a home phone number field, a pet name field, a pet type field, and any other fields that are conventionally included in address book databases.

In accordance with another aspect of the present invention, contact records that are members of a household group include a household property which points to the household record that defines the household group. The household properties or pointers provide for a mode of operation in which contact records appear to include entries of the household record to which they point. Related to this mode of operation is the fact that some of the fields of contact records are of the same type as some of the fields of household records, and some of these fields of the same type are referred to as "like fields." As one example of the present invention, each contact record includes a home address field and a home phone number field, and each household record includes a home address field and a home phone number field, and those fields are referred to as like fields. The number of entries (i.e., amount of data) that needs to be added to or included in an address book database is minimized by selectively sharing entries between like fields of contact records and household records.

During the above-mentioned mode of operation, when a user attempts to view or otherwise use entries from empty like fields of a contact record that is within the household group defined by a household record, entries from the like fields of the household record are provided in place of the entries of the empty like fields of the contact record. The entries from the like fields of the household record are provided in a manner such that it appears that the entries are originating from the like fields of the contact record.

In another aspect of the present invention, a household record is at least partially created from a contact record in a manner such that like entries of the contact record are copied to the household record. Additionally, when a household record is created based upon a previously created contact record, entries for a name field, a letter salutation field, and an address name field of the household record are automatically created based at least partially upon the entry in the name field of the contact record.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 2 illustrates a screen display for creating a contact record of an address book database.

FIG. 3 illustrates a screen display for creating several contact records and a household record of the address book database.

FIG. 4 illustrates a screen display associated with the creation of a household record.

FIGS. 5–10 illustrate screen displays presenting records of the address book database.

DETAILED DESCRIPTION

The present invention is directed toward a system and method for providing interaction between records and groups of records in an address book database. This interaction allows for entries to be shared between records. In one embodiment, the invention may be incorporated into an address book application program that is one of several application programs to be provided in a package entitled "HOME ESSENTIALS 2.0," which is to be marketed by Microsoft Corporation of Redmond, Wash.

Turning now to the drawings, where like numbers reference like parts in the several figures, an exemplary embodiment of the present invention will be described.

Exemplary Operating Environment

Figure 1:
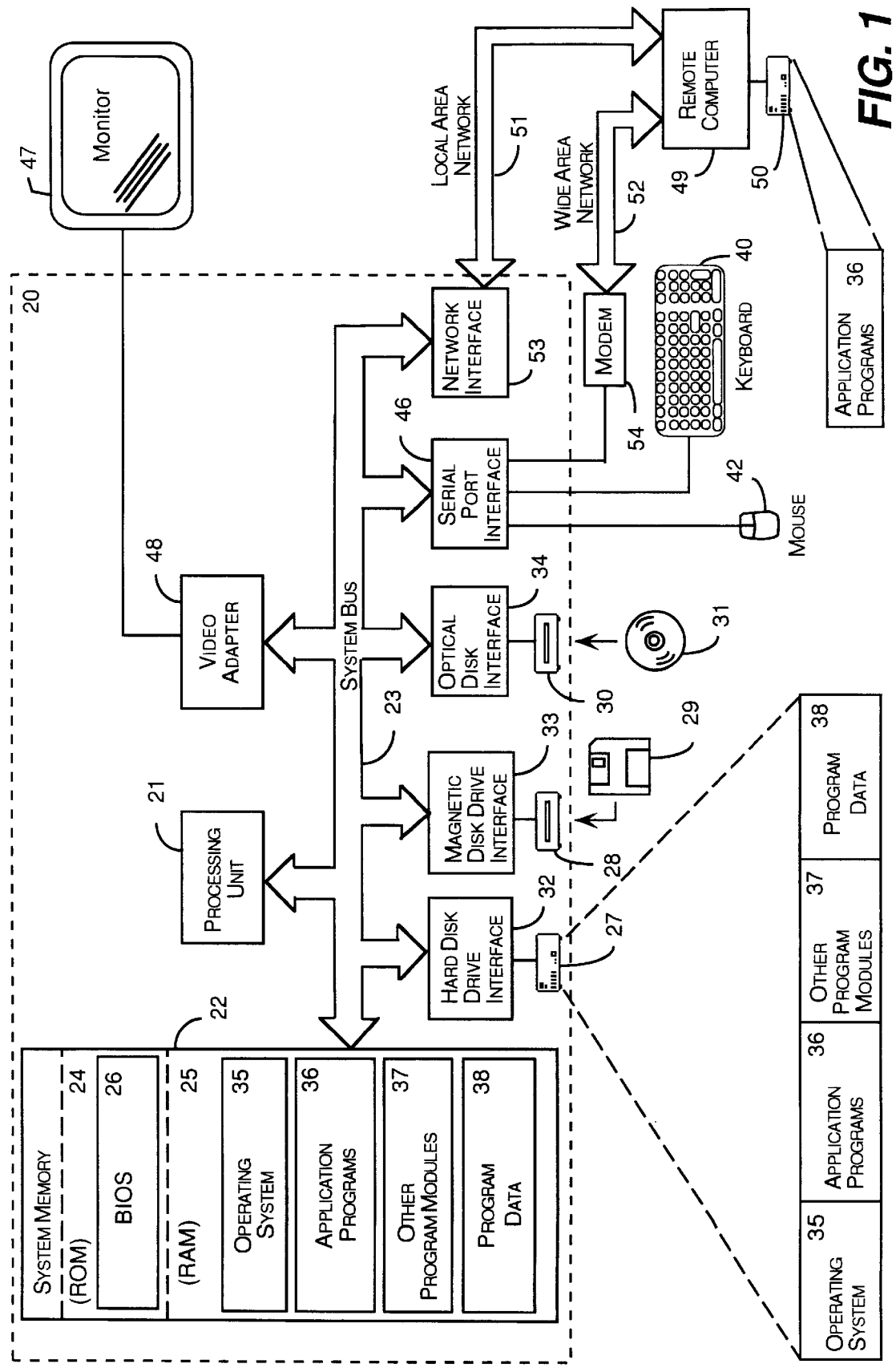
FIG. 1 is a block diagram of a personal computer that provides the operating environment for the exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Screen Displays of the Exemplary Embodiment

Screen displays associated with the exemplary system and methods for populating, viewing, editing and using entries of an exemplary address book database are illustrated in FIGS. 2–12. Prior to specifically addressing the FIGS. 2–12, the exemplary address book database and methods of the present invention will be generally discussed.

The address book database includes contact records, household records and group records. A contact record can be for any individual contact such as person, company or other entity. Both a contact record and a household record can contain a name field, and each preferably further contains other types of fields, such as a birthday field, a home address field, a home phone number field, a work address field, a work phone number field and any other fields that are conventionally included in address book databases. Those skilled in the art will appreciate that each field of a contact record or a household record can contain an entry (i.e., data) that corresponds to the field type. That is, a name field typically contains a name entry, a birthday field typically contains a birthday entry, and so on. Those skilled in the art will appreciate that entries in databases are typically assigned properties to distinguish different types of entries from one another. For example, name entries may be assigned a first property and birthday entries may be assigned a second property so that those entries can be distinguished and assigned to their corresponding fields. Further, those skilled in the art will appreciate that properties may also be referred to as attributes. Similarly, fields can be characterized as being different types. For example, fields of one type are for receiving entries assigned the first property, while fields of a second type are for receiving entries assigned the second property.

It is within the scope of the present invention for the contact records and the household records to include all of the types of fields that can be included in conventional address book databases. However, in accordance with the exemplary embodiment of the present invention, the fields of the contact records are limited to name fields, birthday fields, home address fields, home phone number fields, work address fields, and work phone number fields in an effort to simplify this disclosure. Similarly, the fields of the household records are limited to name fields, letter salutation fields, address name fields, home address fields, home phone number fields, pet name fields, and pet type fields in an effort to simplify this disclosure.

A household record can further contain a household distribution list having properties that define a household group, which is a collection of contact records, and a family group, which is a collection of contact records and is a subset of the household group. A household distribution list may contain information that documents the relative hierarchy of each contact record in the family group defined by that household distribution list. The hierarchical information in household distribution lists, in combination with other information in the address book database, may be used to generate family trees.

Contact records that are members of a household group include a household property which points to the household record that defines the household group. These household properties or pointers provide for a mode of operation in which contact records appear to include entries of the household record to which they point. Related to this mode of operation is the fact that some of the fields of contact records are of the same type as some of the fields of household records, and some of these fields of the same type are referred to as "like fields." For example, in accordance with the exemplary embodiment of the present invention each contact record includes a home address field and a home phone number field, and each household record includes a home address field and a home phone number field, and those fields are referred to as like fields. In accordance with the present invention, the number of entries (i.e., amount of data) that needs to be added to or included in the address book database is minimized by selectively sharing entries between like fields of contact records and household records.

During the above-mentioned mode of operation of the exemplary embodiment of the present invention, when a user attempts to view or otherwise use entries from empty like fields of a contact record that is within the household group defined by a household record, entries from the like fields of the household record are provided in place of the entries of the empty like fields of the contact record. The entries from the like fields of the household record are provided in a manner such that it appears that the entries are originating from the like fields of the contact record being queried.

In accordance with the exemplary embodiment of the present invention a household record may be created based upon a previously created contact record, and at least a portion of the entries of the contact record are copied to the fields of the household record. For example, when a household record is created based upon a previously created contact record, copies of entries of the like fields of the contact record populate the like fields of the household record in a manner that minimizes the number of entries that need to be added to the database. Additionally, each contact record includes a name field and each household record includes a name field, however those fields are not referred to herein as like fields. Nonetheless, in accordance with the exemplary embodiment of the present invention, portions of entries from name fields of contact records are shared with household records in a manner that minimizes the number of entries (i.e., amount of data) that need to be added to an address book database. When a household record is created based upon a previously created contact record, entries for the name field, the letter salutation field, and the address name field of the household record are automatically created based at least partially upon the entry in the name field of the contact record.

Turning now to FIGS. 2–4, those figures illustrate exemplary GUI screen displays that are presented on the monitor 47 (FIG. 1) and can be used for populating the address book database of the present invention. The screen displays of FIGS. 2–4 are presented in response to a user selecting a GUI object 58, a GUI object 60 and a GUI object 62, respectively. Each of the GUI objects 58, 60 and 62 are illustrated in the form of a tab. It is preferable for each of the screen displays of FIGS. 2–4 to be sequentially available for use and contemporaneously active, such as in a windowing environment.

Each of the screen displays of FIGS. 2–4 includes multiple display compartments 64. Those skilled in the art will appreciate that the display compartments correspond to the fields of contact records and household records. Those skilled in the art will also appreciate that each display compartment 64 can be characterized as a data entry blank (i.e., a space where data can be input and edited). That is, the display compartments 64 are for receiving entries from a user for the purpose of creating and populating contact records and household records, as will be discussed in greater detail below. When the screen displays of FIGS. 2–4 are originally presented to a user, the display compartments 64 are blank or empty. The present invention is not limited to the number and type of display compartment illustrated in FIGS. 2–4 and the other figures of this disclosure, as the particular selection and arrangement of the display compartments is provided for illustrative purposes.

As illustrated in FIG. 2, a user has input entries (i.e., data) into each of the display compartments 64a–f. In response to that input of data, a John Cook contact record has been created in the address book database, and the fields of the John Cook contact record that correspond to the display compartments 64a–62f contain the entries displayed in the display compartments 64a–62f, respectively. Those skilled in the art will appreciate that in this disclosure, in some cases records are distinguished by utilizing the entry in their name field (i.e., their name).

As illustrated in FIG. 3, a user has input entries into each of the display compartments 64g–64n. In response to that input of data, a Betty Cook contact record has been created in the address book database, and the fields of the Betty Cook contact record that correspond to the display compartments 64g–64h contain the entries displayed in the display compartments 64g–64h, respectively. The other fields of the Betty Cook contact record are not filled with entries in response to a user's inputting of entries into the screen displays of FIGS. 2–4. As will be explained, the like fields in the John Cook contact record will be indirectly used to provide data as if contained in the empty like fields in the Betty Cook contact record.

As illustrated in FIG. 3, a user has input entries into each of the display compartments 64i–64j. In response to that input of data, a Bruce Cook contact record has been created in the address book database, and the fields of the Bruce Cook contact record that correspond to the display compartments 64i–64j contain the entries displayed in the display compartments 64i–64j, respectively. The other fields of the Bruce Cook contact record are not filled with entries in response to a user's inputting of entries into the screen displays of FIGS. 2–4.

As illustrated in FIG. 3, a user has input entries into each of the display compartments 64k–64l. In response to that input of data, a Nancy Cook contact record has been created in the address book database, and the fields of the Nancy Cook contact record that correspond to the display compartments 64k–64l contain the entries displayed in the display compartments 64k–64l, respectively. The other fields of the Nancy Cook contact record are not filled with entries in response to a user's inputting of entries into the screen displays of FIGS. 2–4.

As illustrated in FIG. 3, a user has input entries into each of the display compartments 64m–64n. In response to that input of data, a Bob Baker contact record has been created in the address book database, and the fields of the Bob Baker contact record that correspond to the display compartments 64m–64n contain the entries displayed in the display compartments 64m–64n, respectively. The other fields of the Bob Baker contact record are not filled with entries in response to a user's inputting of entries into the screen displays of FIGS. 2–4.

The screen display of FIG. 3 further includes a GUI triggering mechanism in the form of a household selection box 72. As illustrated in FIG. 3, a user has selected the household selection box 72. As will be discussed in greater detail below, in response to that selection, (1) a Cook household record has been created, (2) the entries for fields of the Cook household record that correspond to the display compartments 64o–64q (FIG. 4) are automatically generated based upon the last name in the name field the John Cook contact record (i.e., the field that corresponds to the display compartment 64a), (3) entries for the like fields of the Cook household record (i.e., the fields corresponding to the display compartments 64r–64s) are copied from the like fields of the John Cook contact record (i.e., the fields corresponding to the display compartments 64c–64d), (4) the Cook household record defines a Cook household group that includes the John Cook contact record, the Betty Cook contact record, the Bruce Cook contact record, the Nancy Cook contract record and the Bob Baker contact record, and (5) the Cook household record defines a Cook family group that includes all of the contact records of the Cook household record, except for the Bob Baker contact record, and includes information about the hierarchical arrangement of the entities associated with those records.

Also a result of the above-mentioned selecting of the household selection box 72, and as will be discussed in greater detail below, as soon as the user accesses the screen display of FIG. 4 by selecting the GUI object 62, the display compartments 64o–64s contain entries corresponding to the entries in the corresponding fields of the Cook household record. The fields of the Cook household record that correspond to the display compartments 64t–64u are not automatically filled with entries in response to the selection of the household selection box 72. Therefore, when the user first accesses the screen display of FIG. 4, the display compartments 64t–64u and their corresponding fields are empty. As illustrated in FIG. 4, a user has input entries into each of the display compartments 64t–64u, and as a result the corresponding fields of the Cook household record contain the entries that are shown in those display compartments.

The screen displays of FIGS. 5–10 can each be characterized as including a plurality of display compartments that are arranged in columns and rows. Each of the display compartments is illustrated in the form of a rectangle. Those skilled in the art will appreciate that each display compartment can be characterized as a data entry blank (i.e., a space where data can be input and edited). In each of the FIGS. 5–10, each row of display compartments corresponds to either a contact record, a household record, or a group record. That is, the first, second, third, fourth, fifth and sixth rows of display compartments correspond to the above-discussed Bob Baker contact record, Cook household record, Betty Cook contact record, Bruce Cook contact record, John Cook contact record, and Nancy Cook contact record, respectively.

Also included in FIGS. 5–10 for illustrative purposes is a Sam Doe contact record, a Holiday Card group record and a Sue Jacobs contact record. In each of the FIGS. 5–10, the seventh, eight, and ninth rows of display compartments correspond to the Sam Doe contact record, the Holiday Card group record and the Sue Jacobs contact record, respectively. It is within the scope of the present invention for the address book database to include many more records than those illustrated in FIGS. 5–10. However, in this disclosure the number of records is limited for purposes of simplicity. Those skilled in the art will appreciate that when an address book database includes numerous records in screen displays like those of FIGS. 5–10, a vertical scroll bar can be incorporated into the screen displays to allow for vertical scrolling through the records.

As illustrated in FIGS. 5–10, each display compartment for the name field of a household record includes a symbol of a house. Each house symbol identifies the display compartments and entries in the row therewith to be associated with a household record. As also illustrated in FIGS. 5–10, each display compartment for the name field of a group record includes a symbol of a card, which is just to the right of the name of the group. Each card symbol identifies the display compartments and entries in the row therewith to be associated with a group record.

In the screen displays of FIGS. 5–10, a heading above each column of display compartments identifies the type of field to which the display compartments in that column correspond. For example, the display compartments in the first column of each of the screen displays of FIGS. 5–10 correspond to the name fields of the contact records, household records and group records in the address book database. The display compartments in the second column of each of the screen displays of FIGS. 5–10 correspond to the home address fields of the contact records and household records in the address book database. The display compartments in the third column of each of the screen displays of FIGS. 5–10 correspond to the home phone number fields of the contact records and household records in the address book database.

Those skilled in the art will appreciate that in the screen displays of FIGS. 5–10, the entries in the home address display compartments are truncated in an effort to clarify the view. Those skilled in the art will also appreciate that columns corresponding to other fields of the contact records and household records are not illustrated in the screen displays of FIGS. 5–10, but that those columns can be characterized as being "off screen" from those screen displays and can be accessed through usage of a horizontal scroll bar 74 associated with the screen displays.

As is also illustrated in FIGS. 5–10, the display compartment for the name field of each record includes a selection box 76 that can be selected or unselected so that a user can select one or more of the records for purposes of generating output, such as printouts, mailing labels or initiating telephone calls or other electronic communications, as should be appreciated by those skilled in the art. Only a select few of the selection boxes 76 are specifically pointed out in FIGS. 5–10 in an effort to simplify those figures.

Figure 5:
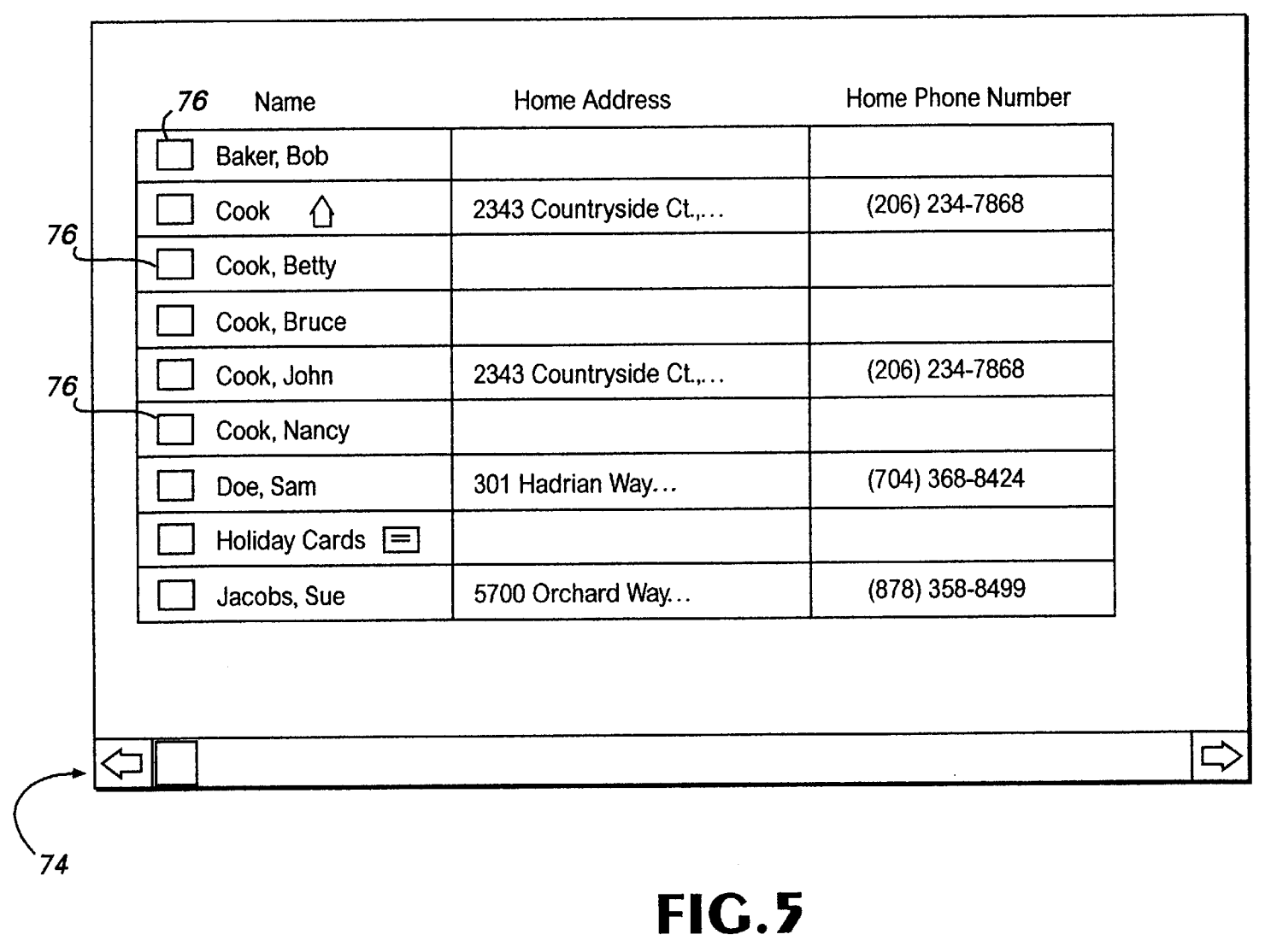
Figure 7:
Figure 9:
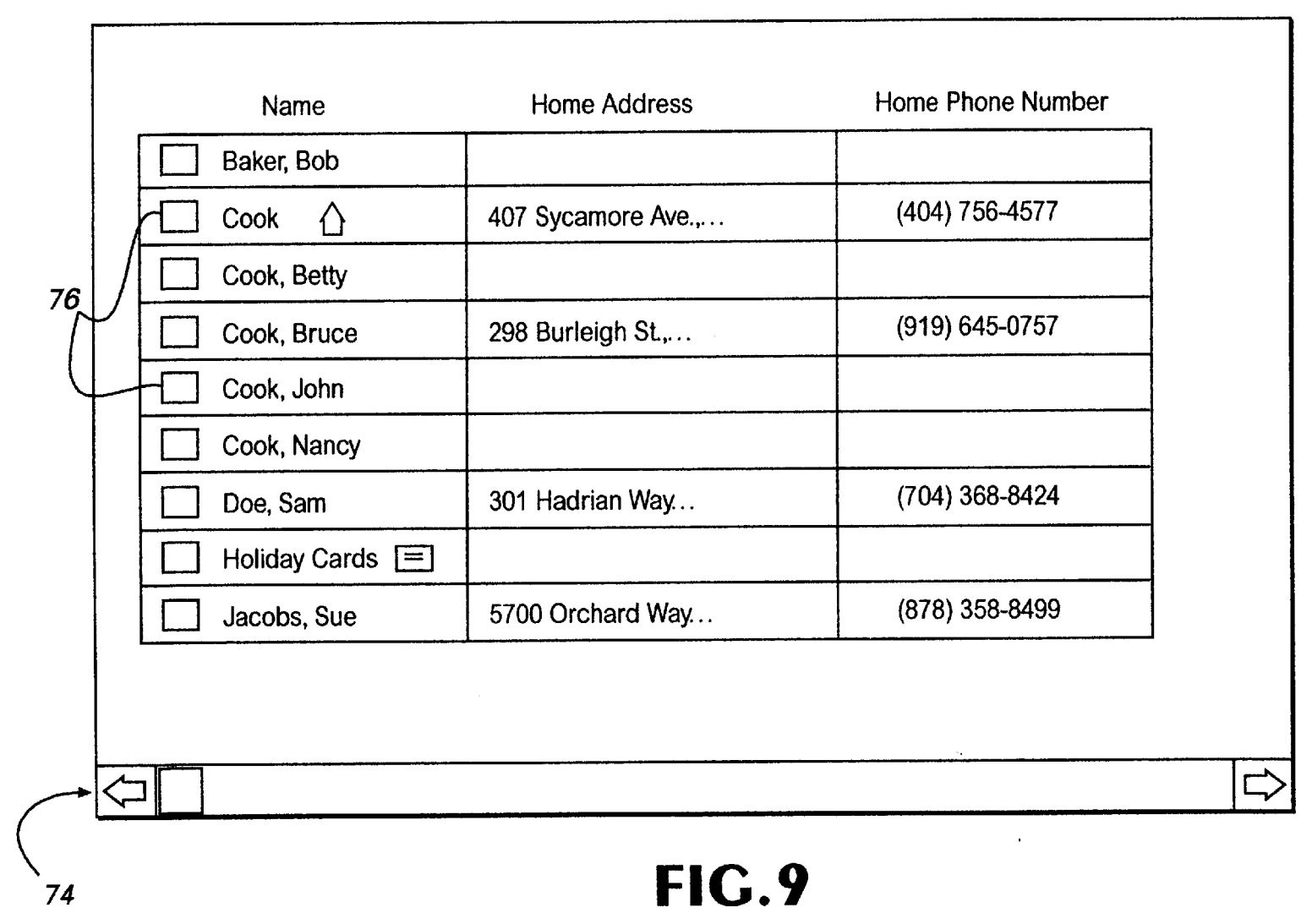
Figure 10:
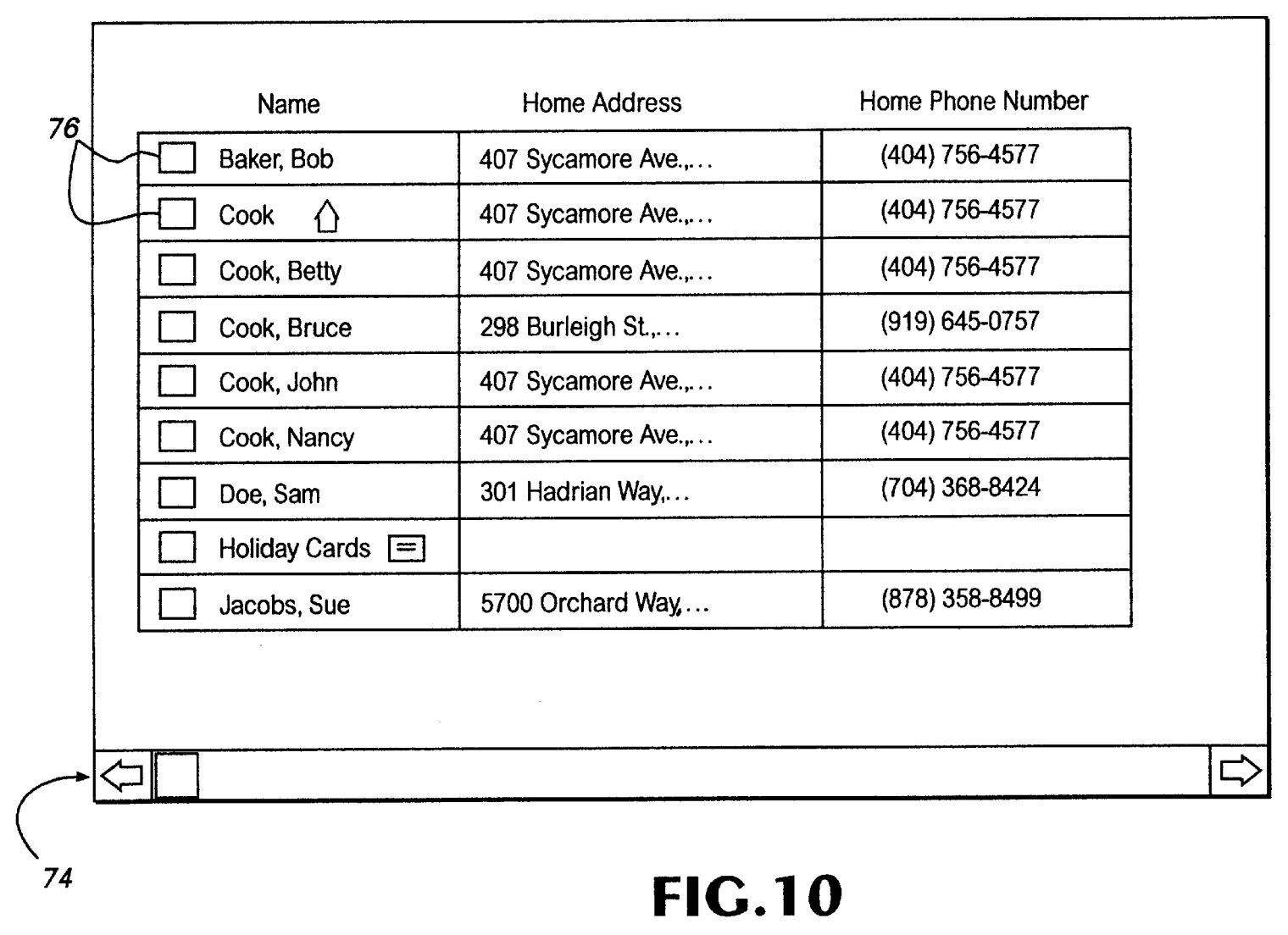

The FIGS. 5, 7 and 9 screen displays are generated in response to a first user command, which can be provided by way of a first GUI object, and the FIGS. 6, 8 and 10 screen displays are generated in response to a different second user command, which can be provide by way of a second GUI object. As discussed in greater detail below, the screen displays of FIGS. 5, 7 and 9 are illustrative of an "actual entries" mode of operation of the present invention, whereas the screen displays of FIGS. 6, 8 and 10 are illustrative of a "pseudo data" mode of operation of the present invention. During the actual entries mode of operation, only the entries contained in the fields of a contact record are displayed in display compartments that correspond to that contact record. The actual entries mode of operation is conventional and therefore should be known to those skilled in the art.

During the pseudo entries mode of operation, entries contained in the fields of a contact record are display in display compartments that correspond to that contact record. However, during the pseudo mode of operation, if a like field of a contact record is empty, and that contact record is within a household group, then the entry from the corresponding like field of the household record that defines the household group is displayed in the display compartment corresponding to the empty like field of the contact record. As a result of the different modes of operation as well as some editing of the entries of the fields, the screen displays of FIGS. 5–10 each present different data, as will be discussed in greater detail below.

The FIG. 5 screen display illustrates the entries from the name fields, home address fields, and home phone number fields of the Bob Baker contact record, the Cook household record, Betty Cook contact record, the Bruce Cook contact record, the John Cook contact record, and the Nancy Cook contact record as if those records had not been edited or otherwise changed after those records were created in the manner described above with reference to FIGS. 2–4. As mentioned above, the FIG. 5 screen display is illustrative of the actual entries mode of operation of the present invention. Therefore, in the screen display of FIG. 5 the display compartments corresponding to the home address fields and the home phone number fields of the Betty Cook contact record, the Bruce Cook contact record, the Bob Baker contact record and the Nancy Cook contact record are empty.

The FIG. 6 screen display also illustrates the entries from the name fields, the home address fields, and the home phone number fields of the Bob Baker contact record, the Cook household record, Betty Cook contact record, the Bruce Cook contact record, the John Cook contact record, and the Nancy Cook contact record as if those records had not been edited or otherwise changed after those records were created in the manner described above with reference to FIGS. 2–4. However, as mentioned above, the FIG. 6 screen display is illustrative of the pseudo entries mode of operation of the present invention. Therefore, in the screen display of FIG. 6 the display compartments corresponding to the home address fields and the home phone number fields of the Betty Cook contact record, the Bruce Cook contact record, the Bob Baker contact record and the Nancy Cook contact record display the entries in the home address field and the home phone number field of the Cook household record. That is, in the pseudo entries mode of operation, display compartments that correspond to empty like fields of contact records that are members of the Cook household group (i.e., the Bob Baker contact record, the Betty Cook contact record, the Bruce Cook contact record, the John Cook contact record, and the Nancy Cook contact record) are filled with entries from the corresponding like fields of the Cook household record. That is, entries from the like fields of a household record are displayed in the display compartments that correspond to empty like fields of contact records that are within the household group defined by that household record.

The condition of the address book database did not change as between FIGS. 7 and 8. For the screen displays of FIGS. 7 and 8, the address book database is in the same condition that it was in for the screen displays of FIGS. 5 and 6, except that the address entries and the home phone number entries in the Bruce Cook contact record and the John Cook contact record have been changed. These changes are reflected accordingly in the screen display of FIG. 7, which is generated during the actual entries mode of operation, and the screen display of FIG. 8, which is generated during the pseudo entries mode of operation.

The condition of the address book database did not change as between FIGS. 9 and 10. For the screen displays of FIGS. 9 and 10, the address book database is in the same condition that it was in for the screen displays of FIGS. 7 and 8, except that the address entries and the home phone number entries in the Cook household record and the John Cook contact records have been changed. These changes are reflected accordingly in the screen display of FIG. 9, which is generated during the actual entries mode of operation, and the screen display of FIG. 10, which is generated during the pseudo entries mode of operation.

Figure 11:
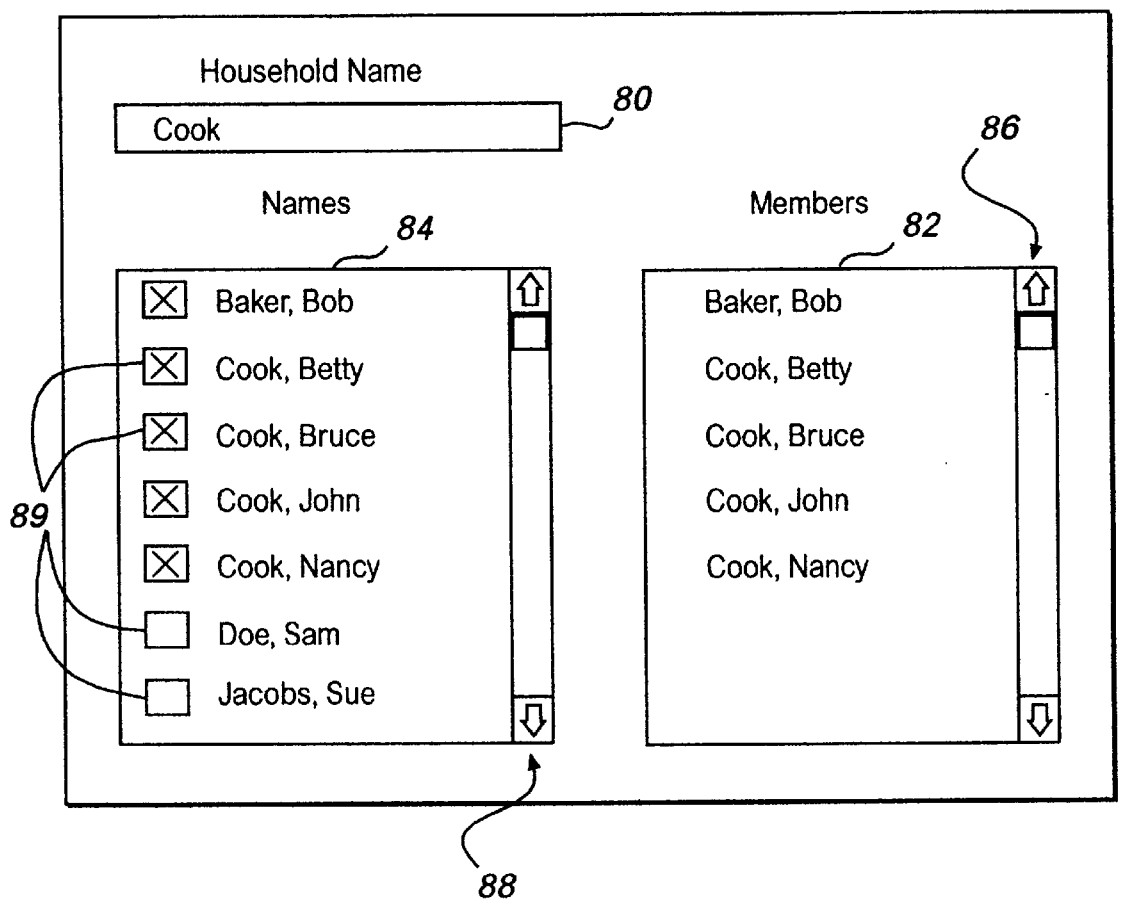
FIG. 11 illustrates a screen display for adding and removing contact records from a household record.

FIG. 11 illustrates an exemplary screen display that is presented on the monitor 47 (FIG. 1) in response to a user command, such as a command provided by way of the selection of a GUI object in combination with the selection of a household record in the screen displays of FIGS. 5–10. The FIG. 11 screen display includes a display compartment 80 that contains the name of the selected household record, a display compartment 82 that includes a list of the names of the contact records that are members of the selected household record, and a display compartment 84 that includes a list of the names of all of the contact records in the address book database. The display compartments 82 and 84 may be equipped with vertical scroll bars 86 and 88, respectively, that allow a user to scroll through the lists in the display compartments 82 and 84 in a manner that those skilled it the art will appreciate.

A membership selection box 89 is included next to each name in the display compartment 84. Only a few of the selection boxes 89 are specifically pointed out in an effort to simplify the figure. The membership selection 89 box next to the names of the contact records that are members of the Cook household group include a mark to indicate that those names are selected, whereas the membership selection boxes 89 next to the names of the contact records that are not members of the Cook household group do not include a mark to indicate that those names are not selected. The membership of the Cook household group can be changed by selecting and unselecting the membership selection boxes 89 in the display compartment 84 in a manner that will be appreciated by those skilled in the art.

Figure 12:
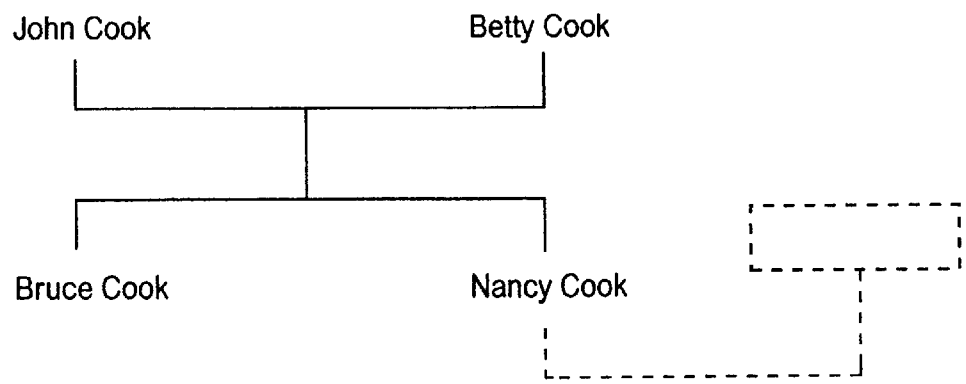
FIG. 12 illustrates a family tree.

FIG. 12 illustrates an exemplary "family tree" screen display that is presented on the monitor 47 (FIG. 1) in response to a user command, such as a command provided by way of the selection of a GUI object in combination with the selection of the Cook household record. The solid lines extending between the names of the John Cook contact record, the Betty Cook contact record, the Bruce Cook contact record and the Nancy Cook contact record provide an indication of the hierarchical arrangement of the members of the Cook family group. The broken lines are intended to illustrate that, if Nancy Cook were the member of a second family group that contained Nancy Cook and her husband, her husband would also be included in the genealogical diagram of FIG. 12, and the broken lines would be solid to provide a combined genealogical diagram of the Cook family group and the second family group.

Methods of the Exemplary Embodiment

Figure 13:
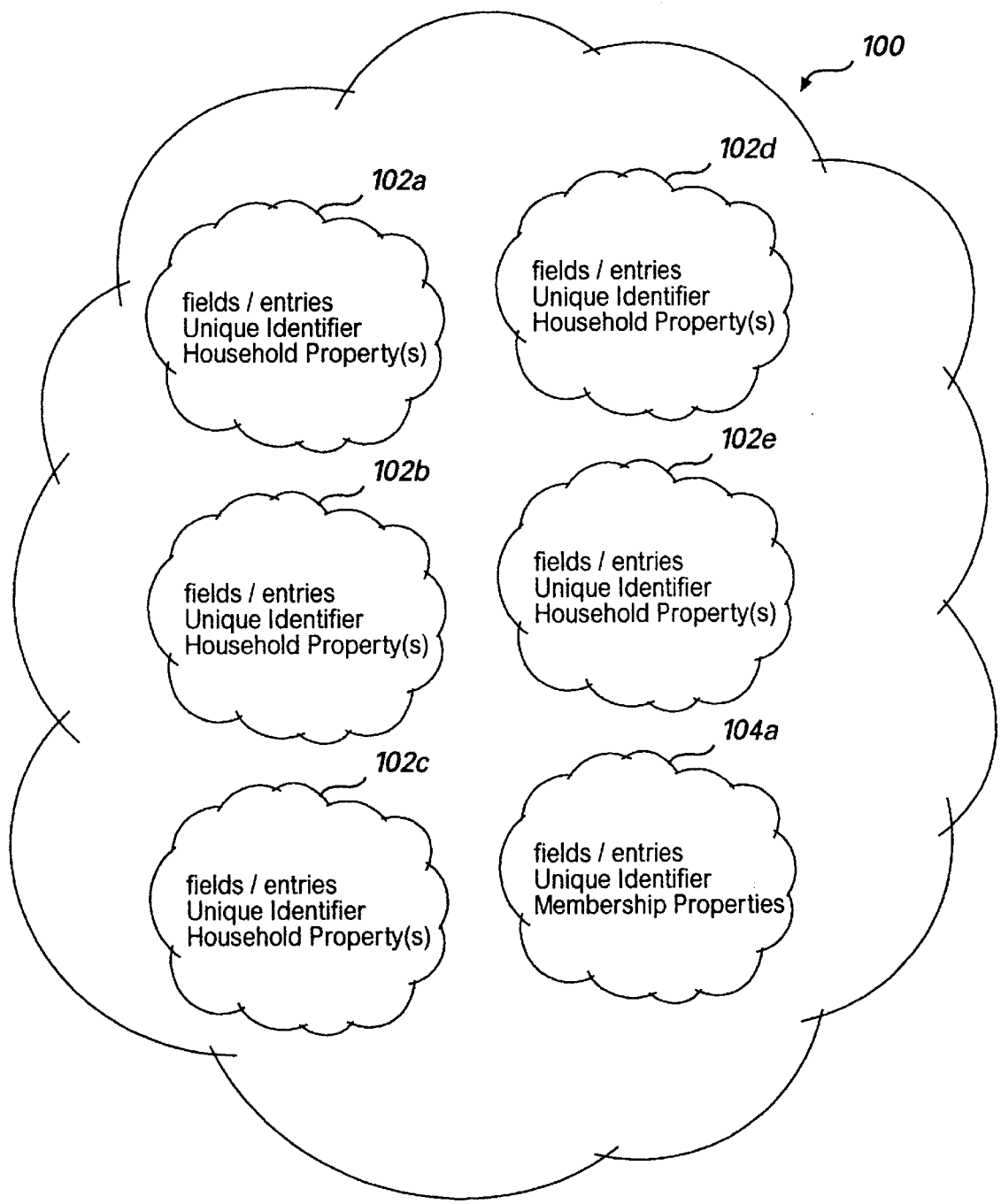
FIG. 13 illustrates the address book database and records.

A discussion of exemplary methods of the present invention may be best understood in connection with a more detailed discussion the address book database. Accordingly, FIG. 13 illustrates an address book database 100 that generally represents the above-discussed address book database and is populated with contact records 102a–102e that represent the above-discussed Bob Baker contact record, Betty Cook contact record, Bruce Cook contact record, John Cook contact record and the Nancy Cook contact record, respectively. The address book database 100 is also populated with a household record 104a that represents the above-discussed Cook household record.

In accordance with the exemplary embodiment of the present invention, each contact record 102 includes, in addition to the previously discussed fields and entries, a unique identifier, such as randomly generated number that is not the unique identifier of another record. The unique identifiers allow contact records 102 to be linked to household records 104, and visa versa, as will be discussed in greater detail below. Also, as discussed in greater detail below, each contact record 102 may include a household property. Accordingly, the terms "fields/entries," "unique identifier" and "household property(s)" are included in each contact record 102 in the address book database 100 to diagrammatically represent the fields, any entries, the unique identifiers and any household properties of the contact records 102.

In accordance with the exemplary embodiment of the present invention, each household record 104 includes, in addition to the previously discussed fields and entries, a unique identifier, such as randomly generated number that is not the unique identifier of another record. The unique identifiers allow household records 104 to be linked to contact records 102, and visa versa, as will be discussed in greater detail below. Also, as discussed in greater detail below, each household record 104 may include one or more membership properties. Accordingly, the terms "fields/entries," "unique identifier" and "membership properties" are included in the household record 104a in the address book database 100 to diagrammatically represent the fields, any entries, the unique identifier and any membership properties of the household record 104.

The address book database 100 preferably resides on any computer-readable media associated with the computer 20 (FIG. 1), as should be understood by those skilled in the art. Those skilled in the art will also appreciate that the present invention includes a conventional mapping feature such that there is correspondence between the nomenclature associated with each of the display compartments 64 in FIGS. 2–4 and the respective fields in the address book database 100. Those skilled in the art will further appreciate that the address book database 100 may contain numerous contact records 102, numerous household records 104 and numerous group records, but that only a few contact records 102 and household records 104 are illustrated in FIG. 13 in an effort to clarify the view.

Figure 14:
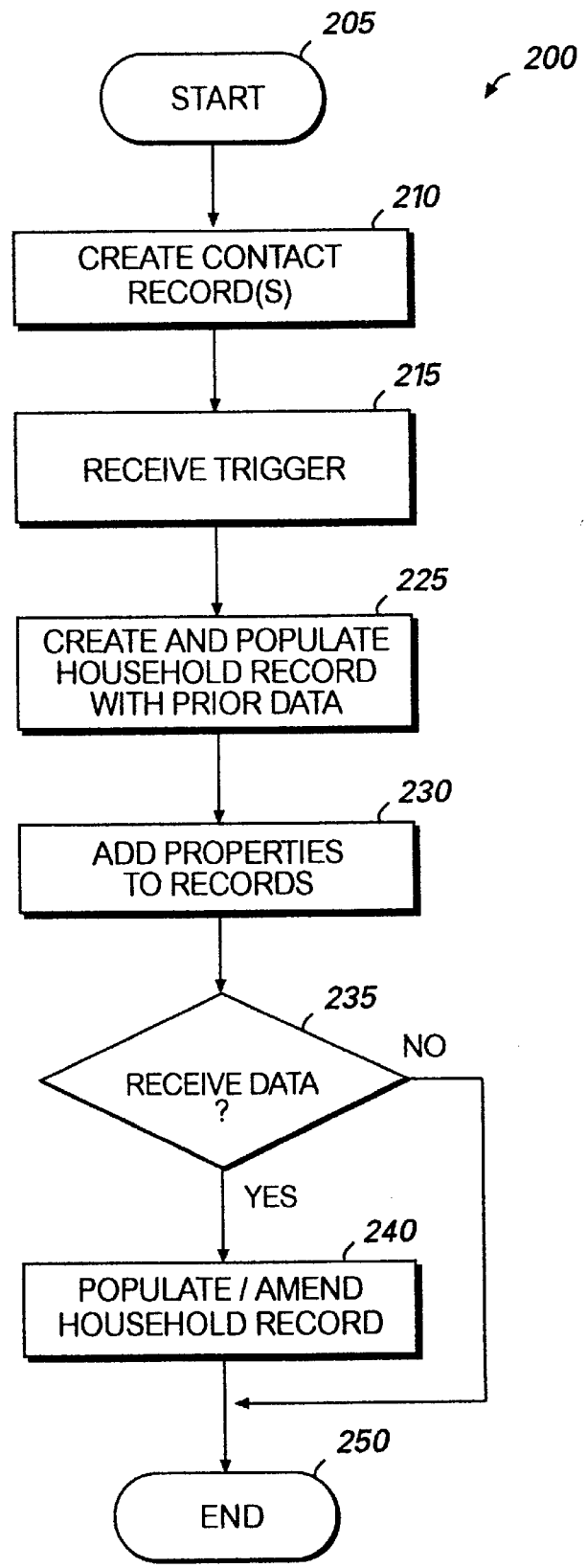
FIG. 14 is a flow diagram illustrating an exemplary method for creating contact records and household records.

Turning now to FIG. 14, an exemplary method 200 by which the address book database 100 (FIG. 13) is populated in response to a user's utilization of the screen displays of FIGS. 2–4 will be described. The method 200 is discussed in the context of FIGS. 2–4, the contact records 102a–102e and the household record 104, however, those skilled in the art will appreciate that the method 200 and the screen displays of FIGS. 2–5 are capable of being utilized to further populate the address book database 100.

The method 200 begins at step 205 and proceeds to step 210, where the contact records 102a–102e (FIG. 13) are created in the address book database 100. Referring also to FIGS. 2 and 13 and as generally discussed previously, in response to the user's inputting of the entries illustrated in the display compartments 64a–64f, the John Cook contact record 102a is created in the address book database 100, and the corresponding fields of the John Cook contact record 102a are populated by those entries.

Referring additionally to FIGS. 3 and 13 and as generally discussed previously, in response to the user's inputting of the illustrated entries into the display compartments 64g–64h, the Betty Cook contact record 102b is created in the address book database 100, and the corresponding fields of the Betty Cook contact record 102b are populated by those entries. In response to the user's inputting of the illustrated entries into the display compartments 64i–64j, the Bruce Cook contact record 102c is created in the address book database 100, and the corresponding fields of the Bruce Cook contact record 102b are populated by those entries. In response to the user's inputting of the entries illustrated in the display compartments 64k–64l, the Nancy Cook contact record 102d is created in the address book database 100, and the corresponding fields of the Nancy Cook contact record 102d are populated by those entries. In response to the user's inputting of the illustrated entries into the display compartments 64m–64n, the Bob Baker contact record 102e is created in the address book database 100, and the corresponding fields of the Bob Baker contact record 102d are populated by those entries. Those skilled in the art will appreciate that, subsequent to the above-discussed substeps of the step 210, some of the fields of the Betty Cook contact record 102b, the Bruce Cook contact record 102c, the Nancy Cook contact record 102d and the Bob Baker contact record 102e are empty.

Referring to FIG. 14, at step 215 a triggering event is detected. As illustrated in FIG. 3, a suitable triggering event is the user's selection of the household selection box 72. In response to the step 215, control is transferred to step 225. At step 225 the Cook household record 104a is created in the address book database 100. The Cook household record 104a is created at the step 225 because the last name currently in the display compartment 64a, or more particularly the last name in the field of the address book database 100 that corresponds to the entry currently displayed in the display compartment 64o, is used in creating the entry that is used in the name field of the Cook household record 104a, as is discussed in greater detail below.

More specifically, at step 225 copies of entries from select fields of the John Cook contact record 102a are automatically retrieved and automatically utilized to populate select fields of the Cook household record 104a. At step 225, both the screen display of FIG. 2 and the screen display of FIG. 3 are active. For example, those skilled in the art will appreciate that both of the screen displays of FIGS. 2 and 3 can be contemporaneously active in a windowing environment. At step 225, the John Cook contact record 102a is selected for the purpose of copying entries in the furtherance of the step 225 because the John Cook contact record 102a is currently active with respect to the active screen display of FIG. 2.

Regarding the entries that are copied from select fields of the John Cook contact record 102a at step 225 in greater detail, the last name (i.e., "Cook") is copied from the name field of the John Cook contact record 102a, and is placed in the name field of the Cook household record 104a. That copied term "Cook" is also used in the automatic creation of entries for the letter salutation field and the address name field of the Cook household record 104a. Referring to FIG. 4, the entry for the letter salutation field of the Cook household record 104a is created by inserting the copied term "Cook" between the terms "Dear" and "Family," and the entry for the address name field of the Cook household record 104a is created by inserting the copied term "Cook" between the terms "The" and "Family."

In accordance with alternative embodiments of the present invention, the extracted last name can be combined with other terms for creating entries for the letter salutation field and the address name field, and the letter salutation field and the address name field can be filled with select entries extracted from multiple of the name fields of each of the contact records 102a–102d because each of those contact records is currently active with respect to the active screen displays of FIGS. 2–3 and within the Cook family group.

Further regarding the entries that are copied from select fields of the John Cook contact record 102a at step 225, the entries copied from the home address field and home phone number field of the John Cook contact record 102a populate the home address field and the home phone number field, respectively, of the Cook household record 104a, without modification. As noted above, in accordance with the exemplary embodiment of the present invention the home address field and the home phone number field are characterized as like fields.

Contemporaneously with or immediately after the completion of step 225, step 230 is performed. At step 230, properties are added to each of the Cook household record 104a, the John Cook contact record 102a, the Betty Cook contact record 102b, the Bruce Cook contact record 102c, the Nancy Cook contact record 102d and the Bob Baker contact record 102e. These properties define the Cook household group and the Cook family group, and enable certain features of the present invention.

At step 230, each of the John Cook contact record 102a, the Betty Cook contact record 102b, the Bruce Cook contact record 102c, the Nancy Cook contact record 102d and the Bob Baker contact record 102e are assigned and receive an identical household property which identifies those contact records as being part of the Cook household group. The household property of the contact records of the Cook household group may include the unique identifier of the Cook household record 104a, so that the household property associated with the contact records 102a–102e distinguishes the Cook household record 104a from other household records. Each of the contact records 102a–102e receive the household property as a result of their active association with the active screen displays of FIGS. 2–3. Stated generally, a household property serves as a kind of pointer to a household record.

At step 230, the Cook household record 104a is assigned and receives membership properties that redundantly define the Cook household group. The properties that define the Cook household group are stored in the form of a household distribution list that is contained by the Cook household record 104a. The household distribution list contained by the Cook household record 104a contains the unique identifier of each of the John Cook contact record 102a, the Betty Cook contact record 102b, the Bruce Cook contact record 102c, the Nancy Cook contact record 102d and the Bob Baker contact record 102e. Each of the contact records of the Cook household group are included in this household distribution list as a result of their active association with the active screen displays of FIGS. 2–3.

At step 230, the household distribution list of the Cook household record 104a is also assigned and receives membership properties that define the Cook family group as including the John Cook contact record 102a, the Betty Cook contact record 102b, the Bruce Cook contact record 102c and the Nancy Cook contact record 102d. Each of the contact records of the Cook family group are included in the Cook family group by virtue of their active association with the display compartments 64a, 64g, 64i and 64k of the screen displays of FIGS. 2–3.

Further, associated with each of the unique identifiers in the Cook family group defined by the household distribution list of the Cook household record 104a is a family hierarchy identifier. The family hierarchy identifiers include parent identifiers for indicating that the unique identifier associated therewith is for a parent, and child identifiers for indicating that the unique identifier associated therewith is for a child. Parent identifiers are assigned to the unique identifiers of the contact records of the Cook family group that are associated with the display compartments 64a and 64g of the active screen displays of FIGS. 2–3. Child identifiers are assigned to the unique identifiers of the contact records of the Cook family group that are associated with the display compartments 64i and 64k of the active screen display of FIG. 3.

Those skilled in the art will appreciate that after steps 225 and 230, the fields of the Cook household record 104a associated with the display compartments 64t–64u of the display of FIG. 3 will not contain entries. If a user edits that which is displayed in any of the display compartments 64a–u of FIGS. 2–4, the step 235 transfers control to the step 240. At step 240 any entries changed as a result of such editing are processed such that only the fields directly assigned to the display compartments where the editing occurred are changed. That is, the screen displays of FIGS. 2–4 are utilized during the actual entries mode of operation. The method 200 terminates at step 250.

Figure 15:
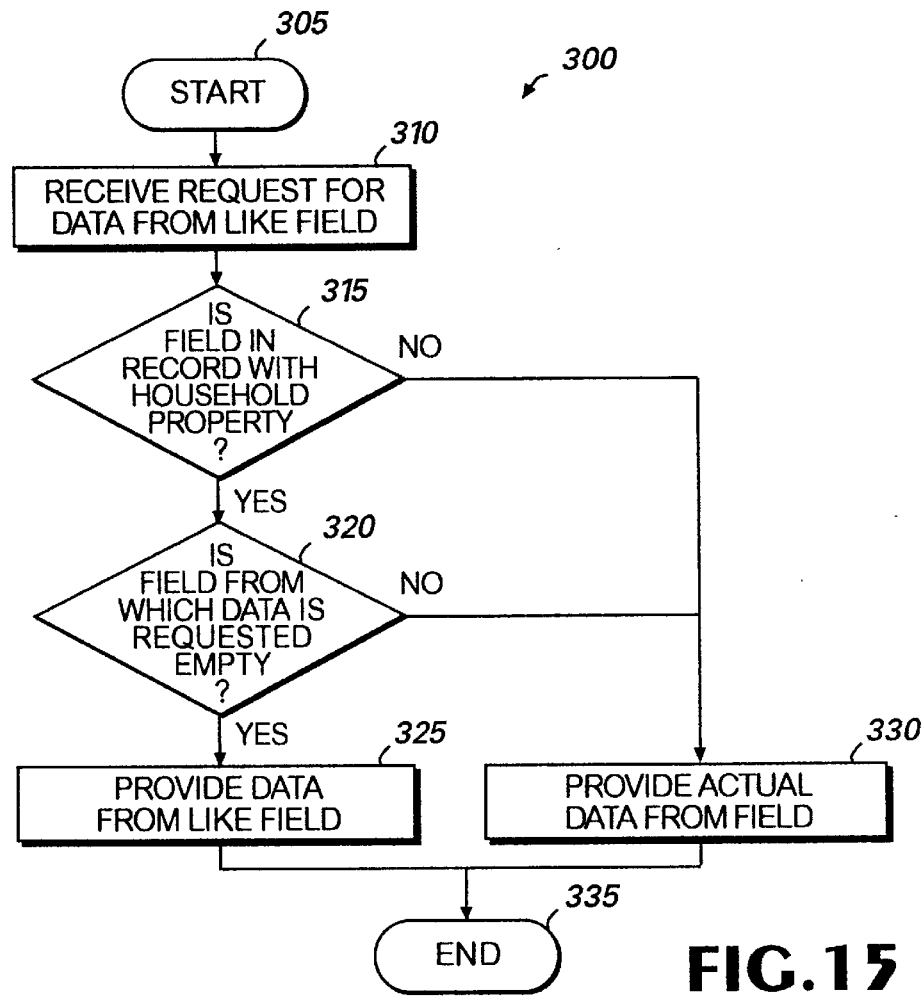
FIG. 15 is a flow diagram illustrating an exemplary method for displaying fields of records.

Turning to FIG. 15, an exemplary method 300 by which the pseudo entries mode of the present invention is achieved so that "pseudo data" of the screen displays of FIGS. 6, 8 and 10 is presented is described. The method 300 is described on a field by field basis, however, those skilled in the art will appreciate that the concepts of the method 300 can be applied to multiple fields of multiple records simultaneously. Also, the method 300 is directed only toward like fields, which were identified above as being select fields of a type that are contained by both contact records 102 and household records 104, which in accordance with the exemplary embodiment of the present invention are the home address fields and the home phone number fields. During the method 300, the fields that are not the like fields are handled in accordance with the actual entries mode. Only the entry contained in a field of a contact record is displayed in the display compartment that corresponds to that entry in the actual entries mode.

The method 300 (FIG. 15) begins at step 305 and proceeds to step 310, where a request for an entry from a specific like field of a specific contact record 102 is received. At step 315, the specific contact record 102 is examined to determine if the specific contact record 102 has a household property. If the specific contact record 102 does not have a household property, then control is directly transferred to step 330. At step 330 the entry, if any, from the specific like field of the specific contact record 102 is provided.

If it is determined at step 315 that the specific contact record 102 does have a household property, the method 300 proceeds to step 320. At step 320 the specific like field of the specific contact record 102 is examined to determine if it contains an entry or is empty. If it is determined at step 320 that the specific like field contains an entry, then control is transferred to step 330 were the entry from the specific like field is provided.

If at step 320 it is determined that the specific like field is empty, then the method 300 proceeds to step 325, which includes several substeps. At step 325, the household property of the specific contact record 102 is utilized to identify the specific household record 104 that defines the household group that the specific contact record 102 is a member of. Then, an entry is retrieved from the like field of that household record 104 that corresponds to the specific like field of the specific contact record 102. At step 325, the entry retrieved from the like field of the household record 104 is provided. If the specific contact record 102 is a member of multiple household groups, it may be the household record 104 associated with the household group most recently joined by the specific contact record 102 that provides the entry at the step 325. Whether at step 325 or 330, control is transferred to step 335 to end the method 300.

It is the operation of the method 300 that causes the screen display of FIG. 6 to include more entries than the screen display of FIG. 5, even thought the screen displays of FIGS. 5 and 6 are generated from the same address book database with identical content and arrangement. Likewise, it is the operation of the method 300 that causes the screen display of FIG. 8 to include more entries than the screen display of FIG. 7, even thought the screen displays of FIGS. 7 and 8 are generated from the same address book database with identical content and arrangement. Of course the content of the address book database is different for FIGS. 7 and 8 than it is for FIGS. 5 and 6, as discussed above. Likewise, it is the operation of the method 300 that causes the screen display of FIG. 10 to include more entries than the screen display of FIG. 9, even thought the screen displays of FIGS. 9 and 10 are generated from the same address book database, with identical content and arrangement. Of course the content of the address book database is different for FIGS. 9 and 10 than it is for FIGS. 5–8, as discussed above.

In accordance with the present invention, the method 300 can operate continuously. Therefore, and for example, if during the operation of the method 300 a user were to select and begin editing the text within the display compartment displaying the home address for Bruce Cook in FIGS. 6, 8 or 10, which are screen displays generated during the pseudo entries mode of operation, an attempt to insert or add an entry would cause an entry to be added to the home address field of the Bruce Cook contact record 102, and due to the operation of the method 300, that entry in the home address field of the Bruce Cook contact record would be displayed in the display compartment displaying the home address for Bruce Cook.

Those skilled in the art will appreciate that the method 300, which is generally discussed above with respect to screen displays, can function when printing or otherwise downloading entries from the address book database 100 (FIG. 13).

Figure 16:
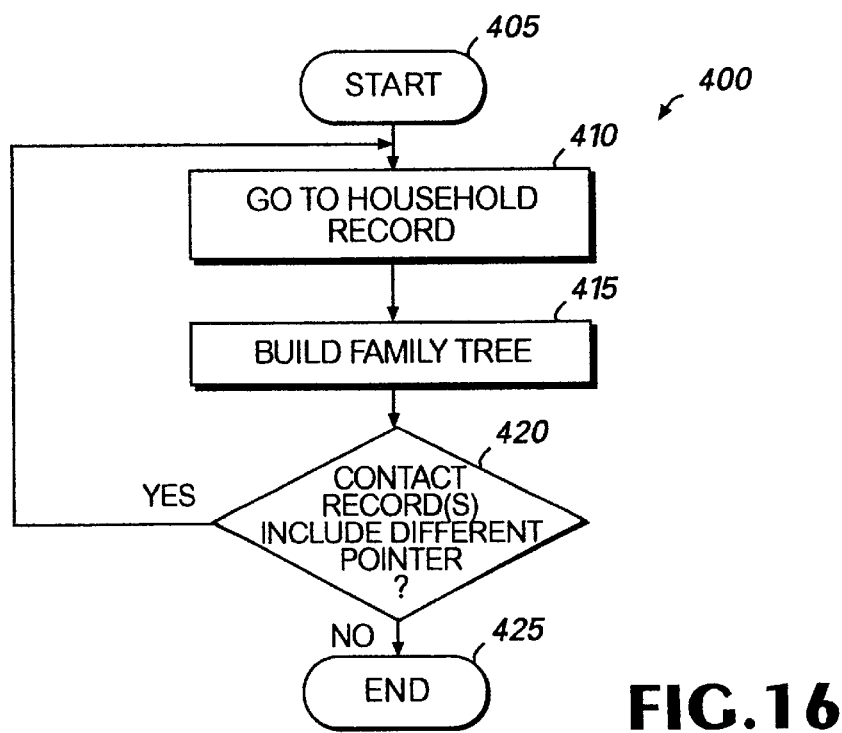
FIG. 16 is a flow diagram illustrating an exemplary method for creating family trees.

Turning to FIG. 16, an exemplary method 400 for generating family trees from the address book database 100 (FIG. 13) will be described. The method 400 begins at step 405. As indicated above, a proper command for generating a family tree can be a user command, such as a command provided by way of the selection of a GUI object in combination with the selection of a household record. At step 410 the appropriate household record is identified in response to the above-mentioned user action. At step 415, the family group defined by the household distribution list, including the parent and child identifiers thereof, of the household record 104 identified at step 410 is utilized to build the family tree. For example, in response to a user's selection of the Cook household record 104a for the purposes of having a family tree generated, the method 400 causes the family tree illustrated in FIG. 12 (without the broken line portions) to be provided.

As mentioned above, in accordance with the exemplary embodiment of the present invention, a contact record 102 can belong to two family groups and thereby have two household properties. As mentioned above, the method 300 (FIG. 15) may be responsive to the household property most recently added to the contact record 102. However, the method 400 is responsive to both or all of the household properties that a contact record 102 might include. That is, at step 420 each contact record 102 represented in the generated family tree is examined to determine if any of those contact records 102 include a household property identifying a household record 104 that has not yet been queried for household distribution list data for the purpose of generating the current family tree. If contact records represented in the family tree include household properties pointing to household records 104 distribution yet been queried for family tree related household distribution list data, then control is transferred to step 410.

At step 410 a household record 104 pointed to by a contact record 102 in the family tree and having family tree related household distribution list data that has not yet been used in the generation of the current family tree is targeted. At step 415, the family tree related household distribution list data, including the parent and child identifiers of the household record 104 that was just identified at the step 410, is utilized to further build the current family tree. For example, if the address book database 100 further contains information representative of Nancy Cook being a member of a second family group with her husband, her husband would also be included in the Cook family tree, as is illustrated by the broken lines in the family tree of FIG. 13. Steps 410, 415 and 420 are repeated until the hierarchy data of the household distribution list of each household record 104 pointed to by a contact record 102 of the family tree has been incorporated into the family tree.

Referring back to the screen display of FIG. 11 and regarding modifying household distribution lists, by selecting a contact record 102 in the display compartment 84 that is not listed in the display compartment 82, that contact record will be added to the household group associated with the household record 104 identified in the display compartment 80. As a result, a household property that points to the household record 104 identified in the display compartment 80 will be added to the contact record 102 selected in the display compartment 84. Likewise, the unique identifier of the contact record 102 selected in the display compartment 84 will be added to the household distribution list of the household record 104 identified in the display compartment 80.

The invention may conveniently be implemented in one or more program modules that are based upon the above disclosure and accompanying drawings. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the invention was in some instances described with respect to a small group of particular types of records, those skilled in the art will appreciate that the invention is applicable to large groups of records and different types of records. Further, although the invention was described with respect to an address book database, those skilled in the art will appreciate that the invention is applicable not only to address book databases, but also to other types of databases.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims.

What is claimed is:

1. In a computer system having an input device and a display device, a method for retrieving information from a database, the database comprising a first record with a first field assigned a first property and a second record with a first like field assigned the first property, wherein the first field and the first like field are capable of containing an entry corresponding to the first property, the first record having an entry in the first field and the second record not having an entry in the first like field, the display method comprising the steps of:

in response to receiving a display request from the input device, querying the database a first time to determine if the second record has an entry in the first like field;

if the first like field of the second record is empty, querying the database a second time to determine if the first record has an entry in the first field; and if the first record has a first entry in the first field, retrieving the first entry from the first field of the first record.

2. The method of claim 1, wherein the method further includes the step of displaying the first entry in a manner that implies that the first like field of the second record also contains the first entry.

3. The method of claim 2, wherein the step of querying the database a second time is further responsive to the step of determining that the second record comprises a property that identifies the first record.

4. The method of claim 2, further comprising the step of displaying an indication that the second record is absent of an entry in the first like field.

5. The method of claim 4, wherein the step of displaying an indication that the second record is absent of an entry in the first like field comprises the step of displaying an entry space for receiving an entry for the first like field.

6. The method of claim 2, wherein the first property identifies the first field and the first like field as being for containing entries of a type selected from the group consisting of phone numbers and addresses.

7. The method of claim 2, wherein the method further comprises the steps of:

receiving from the input device a second entry corresponding to the first property and for being contained in the first like field of the second record;

in response to receiving the second entry, amending the database so that the second record has the second entry in the first like field;

in response to receiving a second display request from the input device, querying the database a third time to retrieve the second entry from the first like field of the second record; and displaying the second entry in a manner that indicates that the first like field of the second record contains the second entry.

8. A computer-readable medium having computer-executable instructions for performing the steps recited in claim 7.

9. A computer-readable medium having computer-executable instructions for performing the steps recited in claim 2.

10. A computer-readable medium having stored thereon a data structure, comprising:

a plurality of records, each record comprising at least one entry and at least one unique identifier such that each record can be located and distinguished from other records of the records by its identifier;

a first record of the records further comprising relationship information comprising the identifier of a second record of the records, whereby the first record is linked to the second record;

a third record of the records further comprising relationship information comprising the identifier of the second record, whereby the third record is linked to the second record; and the second record further comprising information indicating a hierarchical relationship between the first record and the third record, and relationship information comprising the identifiers of the first and third records, whereby the second record is linked to the first and third records.

11. A computer-readable medium having stored thereon a data structure, comprising:

a plurality of records, each record comprising at least one entry and at least one unique identifier such that each record can be located and distinguished from other records by its identifier;

a first record of the records further comprising relationship information comprising the identifier of a second record of the records, whereby the first record is linked to the second record, wherein the first record is for a first individual and the entry of the first record pertains to the first individual;

a third record of the records further comprising relationship information comprising the identifier of the second record, whereby the third record is linked to the second record, wherein the third record is for a second individual and the entry of the third record pertains to the second individual; and the second record further comprising relationship information comprising the identifiers of the first and third records, whereby the second record is linked to the first and third records, wherein the second record is for a group that the first individual and the second individual are included in, and the entry of the second record pertains to the group.

12. The data structure of claim 11, wherein the second record further comprises information indicating a hierarchical relationship between the first individual and the second individual.

13. In a computer system comprising the data structure of claim 12, a method comprising the step of creating a family tree from the data structure.

14. In a computer system having an input device and a database comprising a first record comprising a first entry, a method for creating a second record of the database that is derived from the first record, the method comprising the steps of:

retrieving a copy of the first entry from the first record;

modifying the copy of the first entry to create a second entry that is different from the first entry; and assigning the second entry to the second record so that the second record contains the second entry, wherein the first record is for a contact and the second record is for a group that contains the contact.

15. The method of claim 14, wherein the first record further comprises a third entry, and the step of creating the second record further comprises the steps of:

retrieving a copy of the third entry from the first record; and assigning the copy of the third entry to the second record so that the first record and the second record contain an identical entry.

16. The method of claim 14, wherein:

the first record is for an individual;

the first entry comprises the name of the individual; and the step of modifying comprises the step of adding at least a first word to at least a portion of the name of the individual to create the second entry.

17. A computer-readable medium having computer-executable instructions for performing the steps recited in claim 16.

18. The method of claim 14, wherein:

the first record contains a first unique identifier; and the method further comprises the step of including at least a portion of the first unique identifier in the second record so that the second record is linked to the first record.

19. The method of claim 18, further comprising the steps of:

assigning a second unique identifier to the second record; and including at least a portion of the second unique identifier in the first record so that the first record is linked to the second record.

20. A computer-readable medium having computer-executable instructions for performing the steps recited in claim 18.

* * * * *